United States Patent [19]
Audibert et al.

[11] 3,990,963
[45] Nov. 9, 1976

[54] PROCESS FOR REGENERATING USED LUBRICATING OILS

[75] Inventors: Francois Audibert, Ecully; Maurice Born, Nanterre; Daniel Defives, Paris; Xavier Marze, Lyon, all of France

[73] Assignee: Institut Francais du Petrole, des Carbuants et Lubrifiants et Entreprise de Recherches et d'Activitis Petrolieres Elf, Rueil-Malmaison, France

[22] Filed: Feb. 28, 1975

[21] Appl. No.: 554,079

[30] Foreign Application Priority Data
Mar. 6, 1974 France .............................. 74.07894

[52] U.S. Cl. ................................................ 208/179

[51] Int. Cl.$^2$........................................ C10M 11/00
[58] Field of Search............................ 208/179, 180

[56] References Cited
UNITED STATES PATENTS
1,698,257  1/1929  Cherry................................ 208/179

*Primary Examiner*—Delbert E. Gantz
*Assistant Examiner*—James W. Hellwege
*Attorney, Agent, or Firm*—Millen, Raptes & White

[57] ABSTRACT

Used lubricating oils are first heated to 200°–500° C, optionally with added steam, and then filtered through a membrane such as an ultra-filtration membrane. The latter has preferably a cut range of from 5,000 to 300,000.

19 Claims, No Drawings

PROCESS FOR REGENERATING USED LUBRICATING OILS

A process for purifying and regenerating used lubricating oils by filtration of their solutions through semi-permeable membranes, according to an ultrafiltration or dialysis technique, has already been described in the copending U.S. application Ser. No. 459,413, filed Apr. 9, 1974, now U.S. Pat. No. 3,919,075 issued Nov. 11, 1975.

Ultrafiltration may be defined as a technique consisting of contacting an impure liquid with a first face of a semi-permeable membrane, under a pressure higher than that prevailing on the other face of the membrane, and recovering the resulting filtrate. As concerns dialysis, it is not necessary to apply different pressures on each side of the membrane; conversely a solvent for the oil must be maintained in contact with the second face of the membrane.

Although the above techniques, as applied to the used lubricating oils, particularly to the used compositions of mineral oils for motors, result in a satisfactory removal of most of the oil additives, it has been found that certain metal or metalloid compounds, for example lead, copper and phosphorus compounds, were insufficiently retained by the membrane, so that they were present in excessive amounts in the filtered oil.

An object of the invention is to obtain, by filtration through a membrane, an oil containing less metal and metalloid impurities than according to the prior technique.

Another object is to obtain a purified oil whose composition is more similar to that of a fresh oil.

Other objects will be made apparent to those skilled in the art from the following description.

The process of the invention, whereby the above results are obtained, consists of heating the used lubricating oil to a temperature from 200° to 500° C, preferably from 220° to 400° C, and then passing it through a membrane, for example, an ultrafiltration or dialysis membrane at a temperature compatible with the resistance of the membrane.

According to a preferred embodiment of the invention, the above thermal treatment is carried out in the presence of steam to maintain an inert atmosphere and avoid secondary oxidation reactions. Water injection also mitigates coking when the treatment is conducted in a tubular oven.

The oil heating time above 200° C is usually from 1 second to 6 hours or more. At the higher temperatures, for example 300°–500° C, short heating times are preferred, for example 1 second to 5 minutes; between 200° and 300° C, the heating times are preferably from 10 minutes to 2 hours or more.

It has been found that a treatment at a temperature below 200° C, e.g. about 160°–170° C, did not provide results as good as that obtained according to the invention.

The pressures are usually from 0.1 to 50 bars absolute and preferably from 1 to 40 bars.

According to a preferred embodiment, we use from 0.001 to 1 liter, preferably from 0.01 to 0.2 liter of water (measured in the liquid state) per liter of liquid oil. Satisfactory results may also be obtained outside these limits.

A preferred embodiment consists of passing the mixture of oil and water through one or more pipes in a kiln; the oil may also be brought to the temperature of treatment by passing a stream of steam through the oil, optionally in the presence of liquid water.

Alternatively, calcium oxide may be added to the oil, for example from 0.1 to 3 parts by weight of calcium oxide per 100 parts by weight of oil.

At the outlet of the heating zone, the effluent is cooled and, if necessary, fractionated. The object of this fractionation is to remove the volatile fraction consisting of the water and/or light hydrocarbons initially present in the oil or produced in a low amount during the thermal treatment. This fractionation may be carried out, for example, by passage in a flash tower.

The oil may then be subjected to the ultrafiltration or dialysis treatment.

The ultrafiltration is carried out by means of membranes resistant to hydrocarbons, i.e. membranes which are insoluble in hydrocarbons and are not deleteriously affected by hydrocarbon contact.

An ultrafiltration membranes, we preferably use those formed of the following materials: cellulose, cellulose esters, polytetrafluorethylene, polypentaerythritol, sulfonated polystyrene, quaternary ammonium salts obtained from dialkylamino polystyrene; ionically cross-linked complex polyelectrolytes manufactured from a polymer having sulfonic groups and a polymer having quaternary ammonium groups, these polymers being preferably individually insoluble in water and hydrocarbons; sulfonated polyarylethersulfones; polyethylene, polypropylene, polymers of 2-chlorobutadiene; butadiene-styrene copolymers; vulcanized natural rubber; isoprene-isobutene copolymers; copolymers of acrylonitrile and ionic monomers, specially those treated with hot water. In these various polymers, the molecular weight and the content of ionic groups are such as to make the membranes, used according to the invention, insoluble in the oils to be treated.

Useful membranes are described in the French Pat. Nos. 2 105 306 and 2 105 502 and the Belgian Pat. Nos. 785 741 and 783 835.

The preferred membranes have a cut zone in the range of from 5,000 to 300,000, preferably from 10,000 to 100,000.

By cut zone of an ultrafiltration membrane we mean the approximate molecular weight constituting the limit between the molecular weights of the proteins retained by the membrane and the molecular weights of the proteins not-retained by the membrane, provided the aqueous solution of these proteins is subjected to ultrafiltration under a pressure of about 2 bars.

It has been found that the ultrafiltration of used oils in solution could be advantageously carried out with oil-solvent mixtures having an oil content of 10 to 50 % by volume (v/v), preferably 15 to 35 % by volume (v/v).

The solvent may be a hydrocarbon or a halogenated hydrocarbon.

The process may be conducted without solvent, particularly when treating very fluid oils or when operating at high temperature.

The ultrafiltration or dialysis is conducted at a temperature compatible with the resistance of the membrane, generally at 10°–80° C and under sufficient pressure to maintain the solvent in the liquid state. The pressure applied to the impure oil, when contacted with the first face of the membrane, is preferably higher than the pressure applied to the other face of the membrane, the difference in pressure being lower than that resulting in the perforation or deformation of the membrane. In most cases this difference is from 0.5 to 15 bars.

According to a preferred embodiment, the oil is circulated over the membrane, for example, at a velocity of from 0.2 to 20 meters per second, filtering a portion of the oil while recycling the unfiltered oil or sending the latter to other ultrafiltration cells.

The filtrate is then fractionated to separate the purified oil from the solvent, when a solvent has been used. Any type of operation may be used, for example evaporation in a flash tower or passage through an evaporator.

The used oils to which the process is particularly adapted are mineral oils containing undesirable materials, such as carbon-like materials, metal particles resulting from the wear of lubricated surfaces, lead derivatives resulting from the use of fuel additives; various additives added to the oils or decomposition products thereof, for example:

dispersant-detergent additives, for example calcium, barium and magnesium salicylates, sulfonates, phenates, phosphonates and thiophosphonates. Ashless additives, such as acrylic and methacrylic copolymers with vinylpyridine and vinyl pyrrolidone, polyamides and alkyl derivatives or succinimide;

antioxidant and antiwear additives, such as phenols and aromatic amines, metal dithiophosphates, sulfur organic compounds, chlorine compounds, phosphates, phosphites, phosphonates or phosphinates;

anti-foam additives, for example silicone oils;
viscosity index additives:

polyolefins: polyisobutene, ethylene-propylene copolymers;

ester polymers: polyacrylates, polymethacrylates or polyfumarates.

The used oils recovered from motor-car engines also contain lead soaps resulting from the reaction of acidic products formed by oxidation or alteration of the constituents of the lubricant with lead compounds resulting from the combustion of ethylated fuels.

The following examples, given in non-limitative manner, illustrate the process according to the invention.

EXAMPLE 1

A used oil, as recovered by draining of mechanical devices of motor-cars (engines, gear-boxes and differentials) is heated to 170° C under atmospheric pressure to vaporize off water and light hydrocarbons contained therein. The so-dehydrated topped oil is then supplied to a tubular kiln of 15 m length and 5 mm internal diameter at a feedrate of 5 liters per hour. Water is also supplied at a liquid feed rate of 0.4 liter per hour under a 3 bars absolute pressure. The mixture is introduced into the oven at 200° C and quickly brought to 350°–365° C, said temperature being thereafter maintained until it is discharged from the oven.

The effluent is quickly cooled and subjected to vacuum distillation to withdraw water and volatile portions up to 200° C under 1 mm Hg.

The resulting oil is then subjected to an ultrafiltration treatment: 30 liters of this oil are diluted with 170 liters of n-hexane and the mixture is passed through an ultrafiltration unit comprising a device for recirculating the liquid. The mixture of oil and hexane is passed along the membrane at a speed of 1.1 m/sec. The difference of pressure between the two sides of the membrane is 2 bars.

The membrane has a surface of 1.1 m$^2$. It consists of a complex polyelectrolyte made of a mixture of two copolymers: a copolymer of acrylonitrile and sodium methallyl sulfonate, on the one hand, and a copolymer of acrylonitrile and a vinyl-pyridine quaternized with methyl sulfate, on the other hand. Its permeability to water under 2 bars is 20 m$^3$ per day per square meter. Its cut zone is 20,000. The temperature is 23° C.

150 liters of filtrate is collected (average feed rate: 935 liters per day and square meter); it is evaporated by distillation under a reduced pressure of 5 cm Hg in a thin sheet evaporator. A distillation residue which constitutes the purified oil is obtained in an amount of 22.5 liters (productivity : 141 liters per day per square meter).

EXAMPLE 2

A mixture of 50 kg of the same used oil as in example 1 and 0.5 kg of slaked lime is treated in a reaction vessel provided with heating means, a feed pipe for superheated steam and a condenser. The temperature of the mixture of oil and lime is progressively raised to 270° C while a gentle stream of superheated steam is supplied. The feed rate of steam is so adjusted as to recover at the end of the operation, a condensed hydrocarbon fraction amounting to about 5 %, i.e. approximately the content of unburnt hydrocarbons (gasoline and gas oil) present in the used oil before treatment. After 30 minutes, heating is discontinued and the oil is cooled while maintaining the stream of steam until the temperature has decreased to 150° C.

After complete cooling, the oil is diluted with 150 liters of a gasoline cut distilling at 60°–80° C. The mixture is then supplied to an ultrafiltration unit and the operation is continued as described in example 1.

The following table I gives the content of inorganic elements, as expressed in parts per million:

A. of the crude oil after heating to 170° C (dehydration and topping),

B. of the same oil also heated to 170° C and then subjected to ultrafiltration under the above conditions, C. of the same oil subjected to the thermal treatment and to the ultrafiltration treatment, as defined in example 1, D. of the same oil subjected to the thermal treatment of example 2 and to the ultrafiltration treatment of example 1.

TABLE I

|            | A    | B    | C    | D    |
|------------|------|------|------|------|
| Boron      | 10   | <5   | <5   | <5   |
| Iron       | 200  | 8    | <5   | <5   |
| Lead       | 620  | 270  | <5   | <5   |
| Tin        | 10   | <5   | <5   | <5   |
| Copper     | 35   | 32   | <5   | <5   |
| Magnesium  | 85   | <5   | <5   | <5   |
| Silicon    | 35   | 23   | 15   | 8    |
| Aluminum   | 10   | <5   | <5   | <5   |
| Chromium   | 10   | <5   | <5   | <5   |
| Calcium    | 460  | 55   | <50  | <50  |
| Barium     | 1150 | <50  | <50  | <50  |
| Zinc       | 540  | 90   | <50  | <50  |
| Phosphorus | 520  | 385  | <50  | <50  |

What we claim is:

1. In a process for regenerating a used lubricating oil containing metal or metalloid compounds, by filtration through a semi-permeable membrane at a temperature compatible with the resistance of said membrane, the improvement
in which said oil is first heated to a temperature in the range from 200° to 500° C prior to its filtration through the membrane.

2. A process according to claim 1, wherein the membrane is an ultrafiltration membrane and the pressure prevailing on the oil side of the membrane is higher than that prevailing on the opposite side.

3. A process according to claim 2, wherein the ultrafiltration membrane has a cut zone in the range of from 5,000 to 300,000.

4. A process according to claim 2, wherein the ultrafiltration membrane has a cut zone in the range of from 10,000 to 100,000.

5. A process according to claim 1, wherein the filtration is carried out with the oil diluted in a solvent.

6. A process according to claim 5, wherein the solvent is a hydrocarbon.

7. A process according to claim 1, wherein the filtration temperature is 10°–80° C.

8. A process according to claim 1, wherein the filtration is carried out by circulating the oil over the membrane at a velocity of from 0.2 to 20 meters per second.

9. A process according to claim 1, wherein the oil is heated in admixture with lime.

10. A process according to claim 1, wherein after heating but before filtration, the oil is fractionated to remove therefrom the fractions lighter than the lubricating oil.

11. A process according to claim 1, wherein the heating is conducted for 1 second to six hours.

12. A process according to claim 1, wherein the temperature is 300°–500° C and the heating time is 1 second to five minutes.

13. A process according to claim 1, wherein the temperature is 200°–300° C and the heating time is 10 minutes to 2 hours.

14. A process according to claim 1, wherein the used lubricating oil contains lead or phosphorous.

15. A process according to claim 1, wherein the heating at 200°–500° C is performed in the presence of water.

16. A process according to claim 15, wherein the temperature is from 220° to 400° C.

17. A process according to claim 15, wherein the heating in the presence of water is carried out at 300°–500° C in a tubular kiln.

18. A process according to claim 15, wherein the amount of water is 0.001–1 volume per volume of oil, the volumes being in the liquid state.

19. A process according to claim 15, wherein the amount of water is 0.01 – 0.2 volume per volume of oil, the volumes being in the liquid state.

* * * * *

UNITED STATES PATENT AND TRADEMARK OFFICE
CERTIFICATE OF CORRECTION

PATENT NO. : 3,990,963
DATED : November 9, 1976
INVENTOR(S) : Francois Audibert et al.

It is certified that error appears in the above-identified patent and that said Letters Patent are hereby corrected as shown below:

[73] Assignee: should read --INSTITUT FRANCAIS DU PETROLE
Rueil-Malmaison, France --.

Signed and Sealed this

Fifteenth Day of March 1977

[SEAL]

Attest:

RUTH C. MASON
Attesting Officer

C. MARSHALL DANN
Commissioner of Patents and Trademarks